Nov. 21, 1933.  G. L. MOORE  1,935,886
LUBRICATING APPARATUS
Filed Nov. 16, 1928
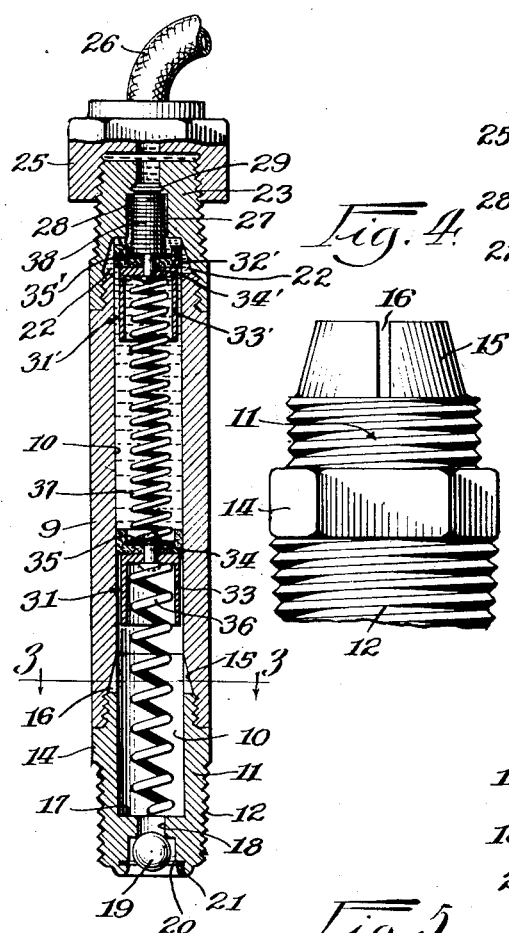
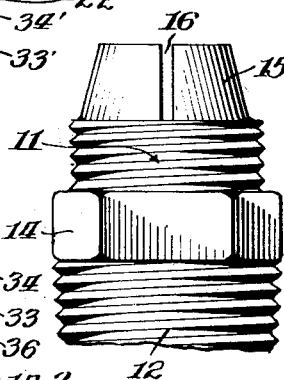
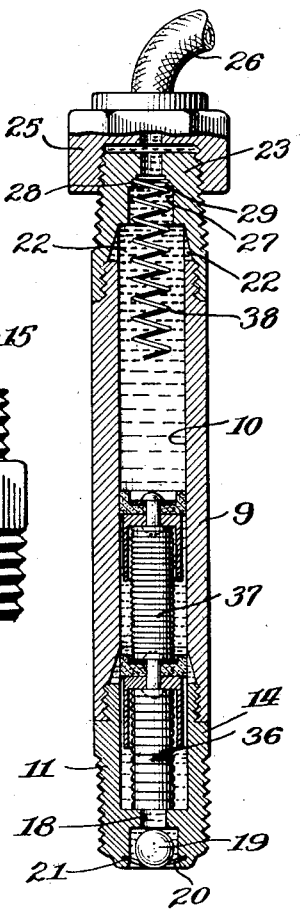
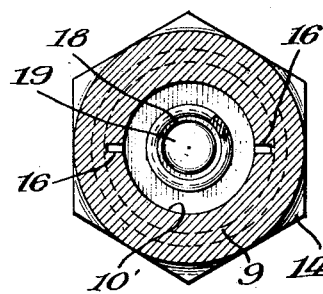
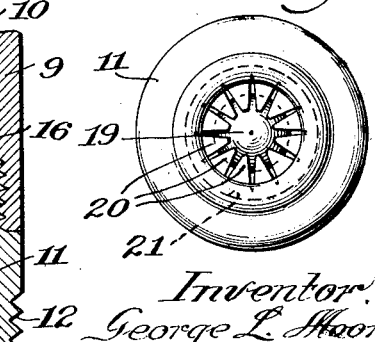

Patented Nov. 21, 1933

1,935,886

UNITED STATES PATENT OFFICE 1,935,886

LUBRICATING APPARATUS

George L. Moore, Chicago, Ill., assignor to Alemite Corporation, Chicago, Ill., a corporation of Delaware Application November 16, 1928
Serial No. 319,992

8 Claims. (Cl. 184—7)

My invention relates to lubricating systems and apparatus in general and more particularly to centralized systems in which a plurality of bearings are lubricated from a common source of lubricant under pressure.

An object of my invention is to provide a new and improved measuring valve positioned at each of the bearings of a centralized lubricating system to measure a quantity of lubricant upon each pressure impulse from the source and deliver it to the bearings.

Another object of my invention is to provide a new and improved measuring valve in a centralized lubricating system whereby the amount of lubricant to be delivered to a bearing upon any one operation may be positively predetermined.

Another object of my invention is to provide a measuring valve wherein the volume of the charge of lubricant to be delivered to a bearing may be reduced or increased in a simple manner.

A further object of my invention is to provide a measuring valve having a spring balanced measuring unit.

A still further object of my invention is to provide a measuring valve which prevents direct communication between the source of supply and the bearing to be lubricated at all times.

Still another object of my invention is to provide a measuring valve which is simple in design, economical to manufacture and has a minimum of moving parts.

Other objects and advantages of my invention will become more apparent through the following detailed description and accompanying drawing in which Fig. 1 is a vertical cross sectional view of one of the measuring valves of my invention showing the parts in their normal position;

Fig. 2 is a vertical cross sectional view of my valve illustrating the position of the parts at the completion of a lubricating operation;

Fig. 3 is an enlarged horizontal cross sectional view of my valve taken on the line 3—3 of Fig. 1;

Fig. 4 is an enlarged fragmentary detail view of one of the parts of my valve;

Fig. 5 is an enlarged fragmentary cross sectional view of one of the plungers in my valve; and Fig. 6 is an enlarged bottom view of my valve.

Referring to the drawing in which like numerals designate like parts throughout the several views, the numeral 9 indicates the body member of my measuring valve and has a central bore 10 through which the lubricant passes. The lower end of the body member 9 is threaded to receive a suitable fitting 11 which is threaded at 12 to afford connection with the bearing or part to be lubricated (not shown).

The fitting 11 is provided with a hex-nut 14 to facilitate attachment to the bearing and the upper end of the fitting is beveled inwardly at 15 to snugly fit a complementary countersunk portion in the lower end of the bore 10 of the body member 9 and thereby form a lubricant-tight seal when the parts are assembled. The fitting 11 has a central bore 10' of the same diameter and in alignment with the bore 10 of the member 9. A pair of slots 16 (Fig. 4) are provided in the upper beveled edge 15 of the fitting 11. The bore 10' terminates in a shoulder 17 and a smaller bore 18 is provided in the lower end of the fitting 11 which affords a passage for lubricant and also a seat for a ball check valve 19 which is held in position by a fingered spring clip 20 mounted in a groove 21 in the extreme lower end of the fitting.

The upper end of the body member 9 is beveled in a manner identical to the upper end of the fitting 11, as shown in Fig. 4, and has a pair of slots 22 cut in its beveled edge similar to the slots 16 of the fitting 11. A bushing 23 is mounted on the upper end of the member 9 by screw threads and is countersunk in a suitable manner to securely fit over and engage the beveled edge at the upper end of the body member 9 and form a lubricant-tight seal. A connector 25 is screw-threaded on the top of the bushing 23 to connect the measuring valve with a supply line 26 which conducts lubricant from the source of supply (not shown). The bushing 23 also has a small central bore 27 which is reduced at 28 to form a shoulder below an annular groove 29 in which is securely held a compression spring 38, the purpose of which will hereinafter be described.

A piston 31 is reciprocably mounted in the bore 10 and comprises a leather cup washer 32, of a size to snugly fit against the walls of the bore 10, and a metal cup washer 33, of slightly less diameter, suitably held together by a rivet 34. A metal washer 35 is provided in the lower part of the cup washer 32 to aid in maintaining the shape of the cup washer. A second piston 31' is also reciprocably mounted in the bore 10 and is identical to the piston 31 just described, having a cup washer 32' of the same size as the washer 32, suitably connected to a metal cup washer 33', of the same size as the washer 33, by means of a rivet 34', and has a metal washer 35' positioned within the cup washer 32'.

These two pistons serve to measure the charge of lubricant to be delivered to a bearing and are maintained in position and controlled by three springs, the strongest of which is a compression spring 36 seated at its lower end on the shoulder 17 of the fitting 11 and having its upper end pressing against and seated in the metal cup washer 33 of the piston 31, tending to urge this piston upwardly. A second spring 37 of lesser strength than the spring 36 is disposed between the two pistons 31 and 31', its lower end seating on the metal washer 35 in the piston 31 and its upper end bearing against the metal cup washer 33' of the piston 31', and tending to urge these two pistons apart from each other. A third spring 38, hereinbefore mentioned, is securely held in the annular groove 29 of the bushing 23 and is a compression spring of lesser strength than the compression spring 37 and its lower end is seated upon the metal washer 35' of the piston 31' and its upper end engages the shoulder 28 of the bushing 23 when the spring is compressed, thereby tending to urge the piston 31' downwardly.

Referring to Fig. 1, which illustrates the structure just described in normal position at a time when no pressure is being exerted from the source of supply, it will be noted that the strongest spring 36 holds the piston 31 well up in the central bore 10 of the member 9 sealing the bore 10 against down flow of lubricant beyond the piston 31.

The spring 37, which is stronger than the spring 38, compresses the spring 38 entirely and holds the piston 31' up nearly to the top of the bore 10. When the piston 31' is in this position it will be noted that the washer 32' is suitably positioned opposite the slots 22 located in the beveled edge at the top of the member 9 so that lubricant may pass around the outer edges of the cup washer 32' and through the slots 22 into the bore 10. It is for this reason that the metal cup washer 33' is made of lesser diameter so that lubricant may pass between its outer periphery and the walls of the bore 10. With the piston 31' in this position, a plunger located at the source of supply (not shown) may be actuated to build up a pressure in the supply line 26, whereby lubricant will be forced through the bore 29, around the cup washer of the piston 31', through the slots 22 and into the bore 10, which flow will continue until the chamber formed between the pistons 31 and 31' is filled with lubricant. A continued pressure will then compress the spring 36 and the piston 31 will move downwardly, as will the piston 31'. When the piston 31' has moved a very short distance the washer 32' will pass beyond the slots 22 and completely cut off further flow of lubricant into the chamber formed between the pistons 31 and 31' in the bore 10. Thus, there is contained between the two pistons a definitely measured volume of lubricant determined by the distance between the pistons and the diameter of the bore 10.

When the piston 31' has moved downwardly so that the lubricant can no longer flow into the chamber described, further pressure on the lubricant from the supply line 26 will act to move the piston 31' downwardly and also move the piston 31 downwardly, further compressing the spring 36 because of the incompressibility of the charge of lubricant between the two pistons. When this charge of lubricant has been moved downwardly far enough for the piston 31 to reach the position shown in Fig. 2 with the cup washer 32 opposite the slots 16 of the fitting 11, the spring 36 will be completely compressed and the piston 31 maintained in this position. The piston 31' continues downwardly, urged on by the pressure of the lubricant in the supply line and in the bore 10 above it, and the lubricant contained in the chamber defined by the two pistons escapes around the cup washer 32 through the slots 16 and into the chamber 10'.

The lubricant flows from the bore 10' through the bore 18 into the bearing, passing the ball check valve 19 when the spring clip 20 is flexed by the pressure of the lubricant. The lubricant continues to be discharged from the measuring chamber until the spring 37 is completely compressed, as shown in Fig. 2.

Upon release of the pressure in the supply line 26, which is accomplished in any suitable manner at the source, the springs 36 and 37 will force the pistons 31 and 31' back to the positions shown in Fig. 1 to await a fresh charge of lubricant to be forced into the measuring chamber and delivered to the bearing as hereinabove described. It will be noted that the piston 31 needs but to move a slight distance upwardly out of alignment with the slots 16 in the fitting 11 to completely seal the chamber 10 against return of lubricant from the bearing. Such return is also prevented by the spring pressed ball check valve 19.

There are many advantages in the use of this measuring valve. One of these valves is placed upon each of the bearings to be lubricated. An impulse from the source of supply will force a predetermined charge of lubricant to the bearing and upon each operation of the valve exactly the same amount of lubricant will be sent to the bearing as upon the previous operation, insuring an accurate feeding of the bearings in the system. Some of the bearings may require more or less lubricant than other of the bearings. In my system of valve control this is readily arranged by providing measuring valves having central bores of different sizes. Thus a larger bearing may regularly receive the required larger volume than the smaller bearing. A great advantage of my invention is that when a bearing becomes worn or for any other reason the amount of lubricant to be supplied to this bearing at regular intervals is to be changed, a mere substitution of springs of different proportionate strengths for the three control springs of my valve will bring about the desired result. In my spring balanced structure there are no rigid members to limit the size of the measuring chamber formed by the pistons, that is, the pistons may be closer together or farther apart, dependent upon the relative strengths of the balance springs, and this movement is not restricted in any way.

Having thus described my invention, what I claim as new and desire to secure by Letters Patent of the United States is:

1. In a measuring valve having a central bore provided with lubricant by-passes therein, a pair of pistons reciprocable in said bore, and spring means bearing directly on both sides of each of said pistons.

2. In a measuring valve having a central bore provided with lubricant by-passes therein, a pair of pistons reciprocable in said bore, a spring disposed between said pistons to urge them apart, and another spring means on the other sides of said pistons tending to force same toward each other.

3. In a measuring valve having a central bore provided with lubricant by-passes therein, a piston reciprocable in said bore in the upper portion thereof, a second piston reciprocable in said bore in the lower portion thereof, spring means tending to position the first mentioned piston opposite one of the lubricant by-passes to allow lubricant to flow between the pistons, and secondary spring means adapted to move said piston downwardly to stop said flow of lubricant when the second piston moves toward another lubricant by-pass to allow lubricant to flow from the space between said pistons.

4. A measuring valve for use in a system of centralized lubrication comprising a measuring chamber, a pair of pistons reciprocable therein, a lubricant by-pass in both the upper and lower ends of the chamber, and spring means tending to locate said pistons in said chamber relative to said by-passes so that a measured charge of lubricant will be expelled from the valve when lubricant under pressure is supplied thereto.

5. In a measuring valve having a central bore provided with lubricant by-passes therein, a piston reciprocable in the upper portion of the bore, a second piston reciprocable in the lower portion of the bore, means tending to position the first said piston opposite one of the lubricant by-passes to allow lubricant to flow between the pistons and exert pressure upon the last said piston, and means adapted to move the first said piston downwardly to stop said flow of lubricant when the last said piston is moved by said lubricant pressure.

6. A measuring valve comprising a barrel, a pair of pistons adapted to reciprocate therein, said barrel being provided with upper and lower by-passes, means tending to locate the upper piston adjacent the upper by-pass to provide a lubricant transfer passage around said piston, means tending to locate the lower piston above the location of the lower by-pass and in spaced relation to the upper piston, and means operable when the lower piston moves downwardly to move the upper piston to close the upper by-pass and permit both pistons to be moved downwardly by fluid pressure until the lower piston cooperates with the lower by-pass to discharge lubricant therethrough.

7. In a lubricating system, a measuring valve having a central bore provided with a pair of lubricant by-passes therein, a pair of pistons in said bore, each of which is reciprocable past a different one of said by-passes, and spring means normally determining the relative positions of said pistons in said bore with respect to said by-passes.

8. A measuring valve for use in a system of centralized lubrication, comprising a central cylinder having a pair of lubricant by-passes therein, a pair of pistons in said cylinder, each of which is reciprocable past its respective by-pass, said pistons forming a measuring chamber therebetween, and spring means normally positioning said pistons with respect to each other so as to make the measuring chamber formed therebetween of a fixed volume, said pistons when moved relatively being adapted to expel a fixed quantity of lubricant from said chamber.

GEORGE L. MOORE.